US008462636B2

(12) United States Patent
Simmons et al.

(10) Patent No.: US 8,462,636 B2
(45) Date of Patent: Jun. 11, 2013

(54) SYSTEMS AND METHODS FOR COMMUNICATION OF MANAGEMENT TRAFFIC OVER LINK AGGREGATION GROUP INTERFACE FOR A NETWORK ELEMENT WITH DISTRIBUTED ARCHITECTURE

(75) Inventors: Steven M. Simmons, Dallas, TX (US); Albert Smith, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 469 days.

(21) Appl. No.: 12/703,503

(22) Filed: Feb. 10, 2010

(65) Prior Publication Data

US 2011/0194562 A1   Aug. 11, 2011

(51) Int. Cl.
*H04L 12/56* (2006.01)

(52) U.S. Cl.
USPC .................. 370/236.1; 370/401; 709/250

(58) Field of Classification Search
None
See application file for complete search history.

(56) References Cited

U.S. PATENT DOCUMENTS

| | | | |
|---|---|---|---|
| 6,741,566 B1 | 5/2004 | Furlong et al. ............... | 370/236 |
| 7,212,492 B1 | 5/2007 | Au et al. ...................... | 370/229 |
| 7,321,597 B2 | 1/2008 | Nguyen et al. ............... | 370/445 |
| 7,586,950 B1 | 9/2009 | Damle et al. ................. | 370/474 |
| 2007/0098006 A1* | 5/2007 | Parry et al. ................... | 370/437 |
| 2008/0240133 A1* | 10/2008 | Tanaka ......................... | 370/401 |
| 2008/0247393 A1 | 10/2008 | Ong et al. .................... | 370/392 |
| 2008/0253295 A1* | 10/2008 | Yumoto et al. ............... | 370/245 |
| 2009/0225752 A1* | 9/2009 | Mitsumori .................... | 370/390 |
| 2010/0182920 A1* | 7/2010 | Matsuoka ..................... | 370/252 |
| 2010/0325271 A1* | 12/2010 | Krzanowski et al. ......... | 709/224 |
| 2011/0038267 A1* | 2/2011 | Smith et al. .................. | 370/248 |

* cited by examiner

*Primary Examiner* — Hassan Phillips
*Assistant Examiner* — Duc Duong
(74) *Attorney, Agent, or Firm* — Baker Botts L.L.P.

(57) ABSTRACT

According to one embodiment, a network element may include one or more network interfaces and a master control unit communicatively coupled to the one or more network interfaces. The one or more network interfaces may include in the aggregate, a plurality of physical ports configured as member ports of a link aggregation group. The master control unit may be configured to maintain a routing table, such routing table including information regarding which of the plurality of physical ports of the link aggregation group is designated as an active port for management traffic egressing via the link aggregation group, wherein the active port carries a communication channel for the management traffic segregated from carrier traffic, and communicate the routing table to each of the one or more network interfaces.

18 Claims, 2 Drawing Sheets

SYSTEMS AND METHODS FOR COMMUNICATION OF MANAGEMENT TRAFFIC OVER LINK AGGREGATION GROUP INTERFACE FOR A NETWORK ELEMENT WITH DISTRIBUTED ARCHITECTURE

TECHNICAL FIELD

This invention relates generally to the field of communications systems and more specifically to processing of communication of management traffic over a link aggregation group interface for a network element with distributed architecture.

BACKGROUND

A communication network includes network elements that route packets through the network, predominantly in line card hardware. Network packets may comprise carrier traffic and management traffic. Carrier traffic is typically data communicated by users of the communication network. On the other hand, management traffic is typically traffic associated with a provider of the communication network used for provisioning network equipment, tracking network status, monitoring alarms, and other network management functionality. Both carrier traffic and management traffic are communicated over the same physical medium using the same interfaces. Because management traffic is overlayed on the same physical network as carrier traffic, the management traffic must have a separate bandwidth allocation and addressing scheme from the carrier traffic. In addition, management traffic is generally limited to operations, administration, and management (OAM) and similar tasks, and is thus narrower in bandwidth than carrier traffic, yet management traffic must be guaranteed to ensure a network element may continuously be managed.

In many instances, communication networks may employ link aggregation. Link aggregation (e.g., IEEE 802.1AX-2008) may generally describe the practice of using multiple network cables or ports in parallel to increase the link speed beyond the limits of any one single cable or port, and to increase redundancy for higher availability. In link aggregation, a group or set of ports may be combined and represented as a single logical port to other components of the network system. Various switching elements of the network system may "see" the aggregated ports (known as a "link aggregation group" or "LAG") as a single logical communication port in the routing tables or databases of network elements external to the LAG.

Despite the functional advantages of LAGs, LAGs may present challenges to communication of carrier traffic and management traffic for at least two reasons. First, as described above, carrier traffic and management traffic must often be segregated. Second, management traffic, while often requiring a minimum level of bandwidth, typically does not require all of the bandwidth of a LAG, meaning a LAG established to carry only management traffic would lead to wasted resources. Third, the physical ports may enter or leave a LAG group at any point without any effect on the logical state (e.g., "UP" or "DOWN") of the LAG. Fourth, traffic which egresses onto multiple physical ports must arrive in the original serial packet order on the ingress logical LAG interface.

A network element for use in communications networks often use a "distributed" architecture in that multiple processing resources present within the network elements pass messages to each other, including messages regarding packet forwarding tables. Such an architecture often permits greater scalability and fault isolation, but may also add complexity to routing of management traffic in a LAG.

SUMMARY OF THE DISCLOSURE

In accordance with the present invention, disadvantages and problems associated with communication of network traffic in a link aggregation group interface in a distributed network element architecture may be reduced or eliminated.

In accordance with an embodiment of the present disclosure, a network element may include one or more network interfaces and a master control unit communicatively coupled to the one or more network interfaces. The one or more network interfaces may include in the aggregate, a plurality of physical ports configured as member ports of a link aggregation group. The master control unit may be configured to maintain a routing table, such routing table including information regarding which of the plurality of physical ports of the link aggregation group is designated as an active port for management traffic egressing via the link aggregation group, wherein the active port carries a communication channel for the management traffic segregated from carrier traffic, and communicate the routing table to each of the one or more network interfaces.

Certain embodiments of the invention may provide one or more technical advantages. For example, certain embodiments may allow for implementation of a link aggregation group and efficient communication of management traffic within such link aggregation group in a distributed network element architecture.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawing, in which.

DETAILED DESCRIPTION OF THE DRAWINGS

Figure 1:
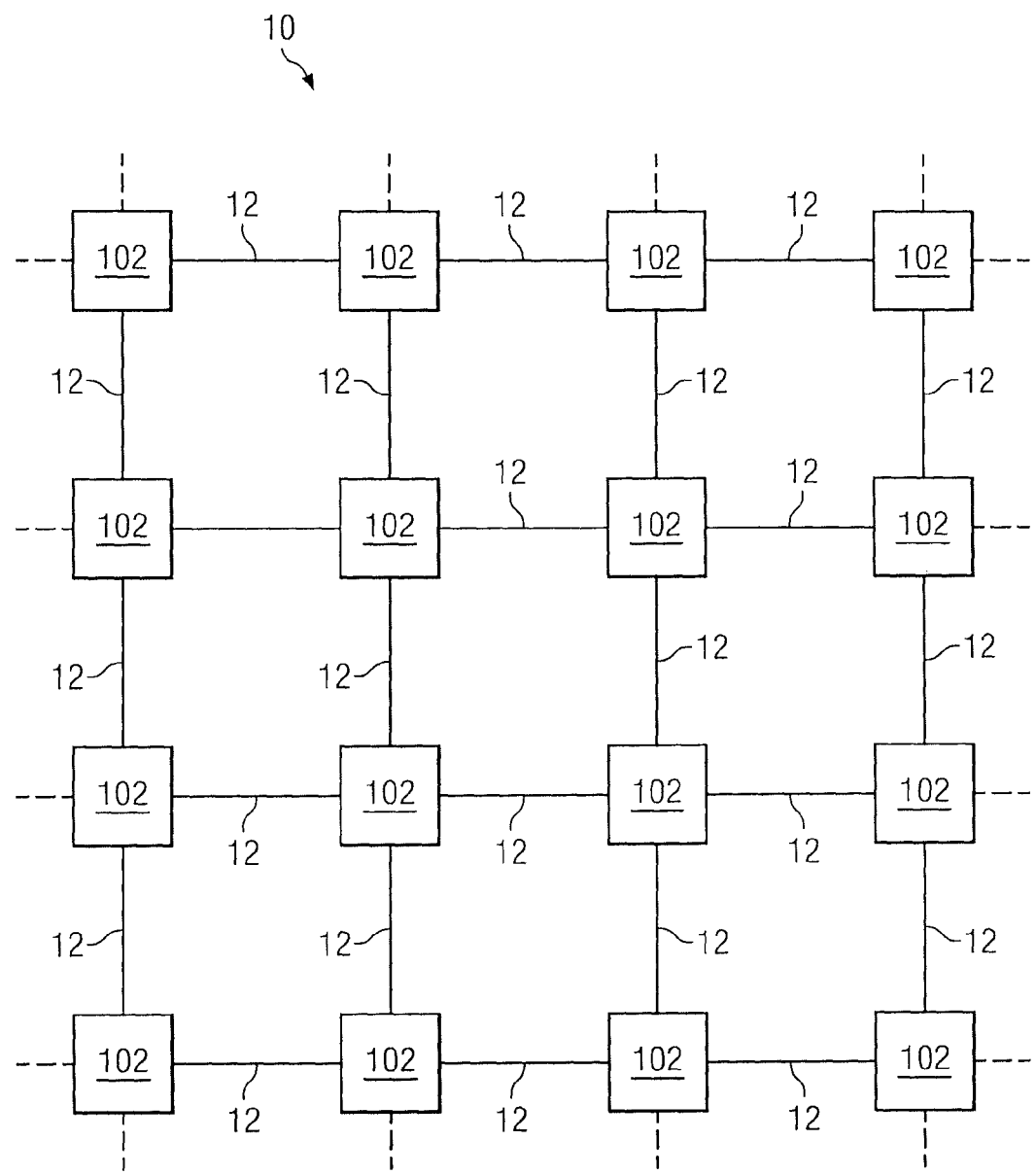
FIG. 1 illustrates a block diagram of an example network, in accordance with certain embodiments of the present disclosure.
Figure 2:
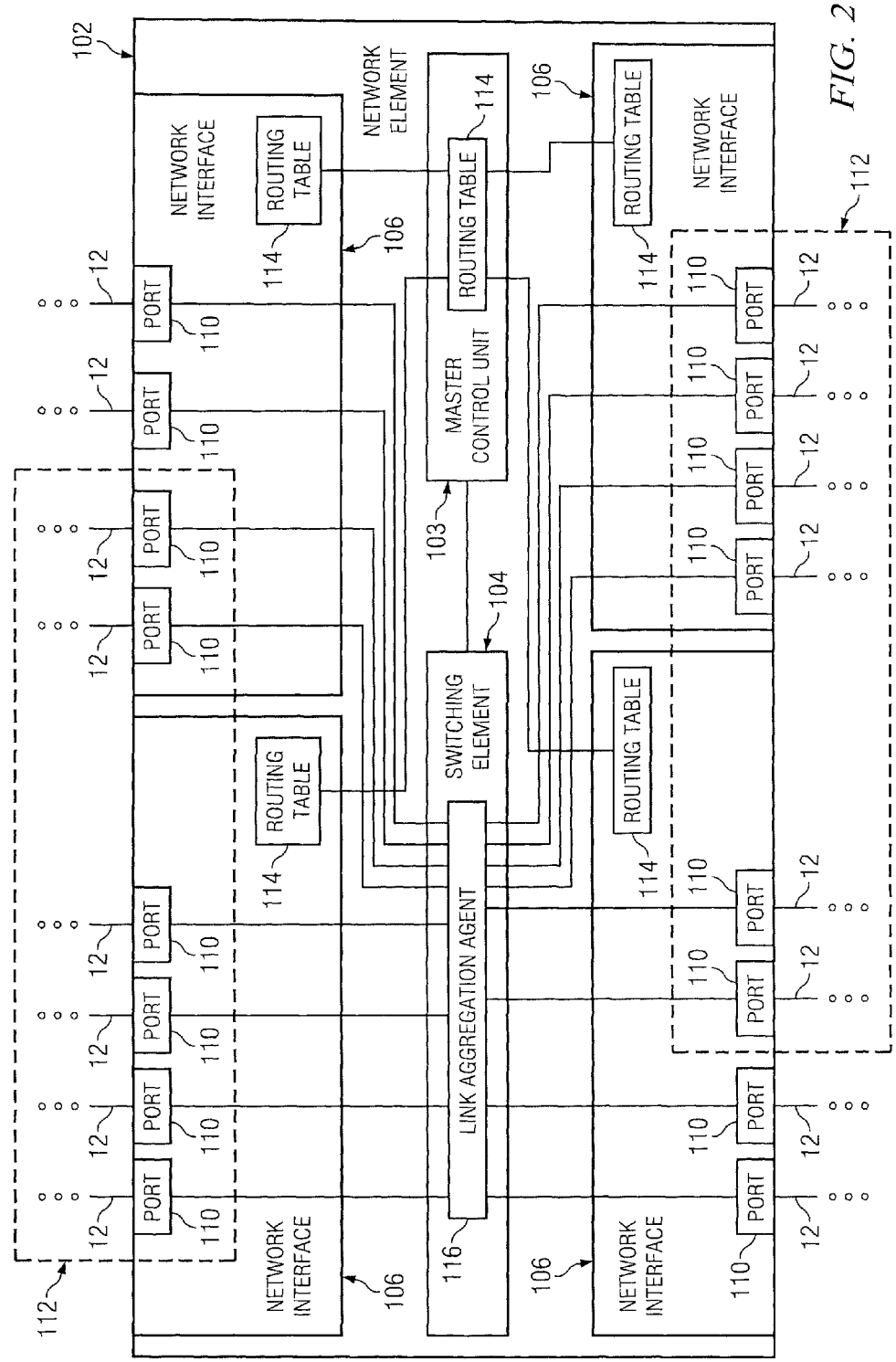
FIG. 2 illustrates a block diagram an example network element, in accordance with certain embodiments of the present disclosure.

Embodiments of the present invention and its advantages are best understood by referring to FIGS. 1-2, like numerals being used for like and corresponding parts of the various drawings.

FIG. 1 illustrates a block diagram of an example network 10, in accordance with certain embodiments of the present disclosure. In certain embodiments, network 10 may be an optical network. Network 10 may include one or more transmission media 12 operable to transport one or more signals communicated by components of network 10. The components of network 10, coupled together by transmission media 12, may include a plurality of network elements 102. In the illustrated network 10, each network element 102 is coupled to four other nodes to create a mesh. However, any suitable configuration of any suitable number of network elements 102 may create network 10. Although network 10 is shown as a mesh network, network 10 may also be configured as a ring network, a point-to-point network, or any other suitable network or combination of networks. Network 10 may be used in a short-haul metropolitan network, a long-haul inter-city network, or any other suitable network or combination of networks. Network 10 may represent all or a portion of a short-haul metropolitan network, a long-haul inter-city network, and/or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, or other suitable medium. In some embodiments, one or more transmission media 12 may be part of a link aggregation group (LAG), in which case multiple physical transmission media 12 may exist coupling network devices 102 despite the fact that the multiple transmission media 12 may logically appear as a single transmission medium to components of network 10 external to the LAG.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

FIG. 2 illustrates a block diagram an example network element 102, in accordance with certain embodiments of the present disclosure. As discussed above, each network element 102 may be coupled to one or more other network elements 102 via one or more transmission media 12. Each network element 102 may generally be configured to receive data from and/or transmit data to one or more other network elements 102. In certain embodiments, network element 102 may comprise a switch configured to route data received by network element 102 to another device (e.g., another network element 102) coupled to network element 102.

As depicted in FIG. 2, each network element 102 may include a master control unit 103, a switching element 104, and one or more network interfaces 106 communicatively coupled to each of master control unit 103 and switching element 104.

Master control unit 103 may include any suitable system, apparatus, or device configured to manage network element 102, including management of routing of data between ports 110. As shown in FIG. 2, master control unit 103 may maintain routing table 114 in accordance with open shortest path first (OSPF) protocol, intermediate system-intermediate system (ISIS) protocol, or any other suitable protocol. Routing table 114 may include any table, database, file, or other data structure configured to maintain information relating a particular ingress port 110 and/or link aggregation group (LAG) 112 to a corresponding egress port 110 and/or LAG 112. In particular, routing table 114 may define the active member port 110 of an egressing LAG 112 to which ingressing management traffic should be communicated. Accordingly, if traffic is to be forwarded from an ingress LAG 112 to an egress LAG 112, network element 102 may receive management traffic via any member port 110 of the ingress LAG 112, and communicate it to the active member port of the egress LAG. From time-to-time, as routing table 114 is updated by master control unit 103, master control unit 103 may communicate such updated routing information to the one or more network interfaces 106, which may in turn store such updated routing information in their respective routing tables 114.

Switching element 104 may be communicatively coupled to master control unit 103 and may include any suitable system, apparatus, or device configured to receive traffic via a port 110 and route such traffic to a particular network interface 106 and/or port 110 based on analyzing the contents of the data and/or based on a characteristic of a signal carrying the data (e.g., a wavelength and/or modulation of the signal). For example, in certain embodiments, a switching element 104 may include a switch fabric (SWF).

As shown in FIG. 2, switching element 104 may include link aggregation agent 116. Link aggregation agent 116 may include any suitable system, device, or apparatus configured to manage link aggregation of ports 110 in network element 112. In some embodiments, link aggregation agent 116 may manage LAGs 112 and member ports 110 thereof in accordance with link aggregation control protocol (LACP) and/or another suitable protocol. In operation, link aggregation agent 116 may track each member port 110 of a LAG 112 to determine if the member port 110 is "alive" or "up," and selects the "active" member port 110 for egressing management traffic. Such selection may be made in any suitable manner, including random selection, an election, or other suitable manner known in the art.

Each network interface 106 may include any suitable system, apparatus, or device configured to serve as an interface between a network element 102 and a transmission medium 12. Each network interface 106 may enable its associated network element 102 to communicate to other network elements 102 using any suitable transmission protocol and/or standard. Network interface 106 and its various components may be implemented using hardware, software, or any combination thereof. For example, in certain embodiments, one or more network interfaces 106 may include a network interface card. In the same or alternative embodiments, one or more network interfaces 106 may include a line card.

As depicted in FIG. 2, each of network interfaces 106 may include one or more physical ports 110 and a routing table 114. Each physical port 110 may include any system, device or apparatus configured to serve as a physical interface between a corresponding transmission medium 12 and network interface 106. For example, a physical port may comprise an Ethernet port, an optical port, or any other suitable port.

Similar to routing table 114 of master control unit 103, routing table 114 of each network interface may include any table, database, file, or other data structure configured to maintain information relating a particular ingress port 110 and/or link aggregation group (LAG) 112 to a corresponding egress port 110 and/or LAG 112. In particular, routing table 114 may define the active member port 110 of an egressing LAG 112 to which ingressing management traffic should be communicated.

As shown in FIG. 2, two or more physical ports 110 of a particular network element 102, their corresponding physical ports 110 of another network element 102, and their corresponding transmission media 12 may be grouped into a link aggregation group (LAG) 112. Although each LAG 112 in FIG. 2 is depicted as including a particular number of member physical ports 110, LAG 112 may include any suitable number of member physical ports 110. LAG 112 may combine its member ports or member LAGs using link aggregation such that the member ports are represented as a single logical port to components of network 10 external to LAG 112.

In operation, a network interface may route data in accordance with Link Access Protocol—Channel D (LAPD), Address Resolution Protocol (ARP), or any other suitable protocol. In particular, a port 110 of a network interface 106 may receive ingressing management traffic and, based on forwarding table 114 and the incoming traffic's destination address, determine the egress port 110 (including determining an active port 110 of a LAG 112 for egressing management traffic), as described in greater detail below.

As mentioned above, network 10 may communicate traffic in accordance with OSI, IP (e.g., IPv4), and any other suitable communications protocol. To facilitate communication via various protocols, components of network interface 102 may be configured to support management traffic forwarding in a LAG configuration via such protocols, as described below.

OSI

With respect to OSI, an LAPD state machine may be maintained for each port 110 of a network interface 106. Maintenance of such state machine allows each port to identify if it can send and/or receive traffic (e.g., whether it is "up" or "alive"). An indication of the statuses for each port 110 may be communicated to link aggregation agent 116, which may determine which port 110 of a LAG 112 is to be the active port 110 for management traffic egress, and such determination may be communicated from link aggregation agent 116 to the determined active port 110, or its associated network interface 106. The active port 110, or its associated network interface, may communicate to master control unit 103 that the active port 110 is the active port 110 for the LAG 112. Master control unit 103 may update its routing table 114 to indicate the identity of the active port 110 for LAG 112, and communicate the updated routing information to each network interface 106.

Accordingly, management traffic ingressing on a network interface 106 may then be forwarded to the designated active port 110 based on the contents of the forwarding table 114 local to the network interface 106. Thus, active port 110 may carry a communication channel for the management traffic segregated from the carrier traffic. In addition, the active port 100 may enforce packet order of the management traffic, such that ingressing management traffic maintains its packet order upon egress.

IP

With respect to IP (e.g., IPv4), each port 110 of a network interface 106 may be represented as in interface in an IP stack. Link aggregation agent 116 may select an active port 110 of a LAG 112 for egressing management traffic, and communicate such selection to member ports 110 of the LAG 112, or their respective network interfaces 106. Active port 110 or its respective network interface 106 may mark the IP stack interface of active port 110 as "up," while other ports 110 of the LAG 112 or their respective network interfaces 106 may mark the IP stack interfaces of such other ports 110 as "down." Further, such other ports 110 or their respective network interfaces 106 may mark the IP stack interfaces of such other ports 110 as indicating whether the IPv4 stack interfaces are tunneled. Accordingly, if an IP stack interface is "down" and tunneled, all traffic that arrives on such IP stack interface is sent directly to the tunnel destination: the active port 110 whose IP stack interface is "up." Any such tunnel may terminate on a port 110 of on the same network interface 106 of the receiving port, or on a different network interface 110.

Address resolution protocol resolution may be carried out on the network interface 106 of the active port 110. Accordingly, any IP stack interface/port 110 may receive egressing traffic.

Active port 110 or its respective network interface 106 may communicate to master control unit 103 that it is active. At the master control unit 103 level, one IP stack interface may represent all of the ports 110 of LAG 112. In response to receiving the indication of the active port 110, master control unit 103 may update its routing table such that the physical port 110 associated with the IP stack interface associated with LAG 112 is updated with the identity of the active port 110. By updating all physical ports of the LAG's IP stack interface, network 10's OSPF route protocol does not need to converge. All changes to routing table 114 of master control unit 114 may be communicated to each network interface 106.

Accordingly, management traffic ingressing on a network interface 106 may then be forwarded to the active port 110 based on the contents of the forwarding table 114 local to the network interface 106. Thus, active port 110 may carry a communication channel for the management traffic segregated from the carrier traffic. In addition, the active port 100 may enforce packet order of the management traffic, such that ingressing management traffic maintains its packet order upon egress.

In addition, network element 102 may be configured to provide for dynamic recovery when an active port 110 or components coupled to an active port 110 fail, go down or are removed from a LAG, thereby rendering the active port 110 unsuitable for communication of network traffic. In such a scenario, link aggregation agent 116 may determine that an active port 110 or the communication link associated therewith has gone down or has been removed from a LAG, and may in response select a new active port 110. Link aggregation agent 116 may communicate the identity of the new active port 110 to master control unit 103 or to the network interface 108 having the new active port 110 (in which case, the network interface would communicate the identity of the new active port 110 to master control unit 103). In response to receiving the identity of the new active port 110, master control unit 103 may update routing table 114, and communicate the updated routing table 114 to network interfaces 108.

A component of network 10 and/or a network element 102 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 and/or a network element 102 without departing from the scope of the invention. The components of network 10 and/or network element 102 may be integrated or separated. Moreover, the operations of network 10 and/or network element 102 may be performed by more, fewer, or other components. Additionally, operations of network 10 and/or a network element 102 may be performed using any suitable logic. As used in this document, "each" refers to each member of a set or each member of a subset of a set.

Certain embodiments of the invention may provide one or more technical advantages. A technical advantage of one embodiment may be that a distributed hardware-based approach may be used to process heartbeat messages communicated through a link aggregation group.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A network element comprising:
   one or more network interfaces including, in an aggregate, a plurality of physical ports configured as member ports of a link aggregation group;
   a master control unit communicatively coupled to the one or more network interfaces and configured to:
      maintain a routing table, such routing table including information regarding which of the plurality of physical ports of the link aggregation group is designated as an active port for management traffic egressing via the link aggregation group, wherein the active port carries a communication channel for the management traffic segregated from carrier traffic and is one of a plurality of member ports of the link aggregation group that are alive; and
      communicate the routing table to each of the one or more network interfaces; and
   a switch fabric communicatively coupled to the one or more network interfaces and having a link aggregation agent configured to:
      determine which member ports of the link aggregation group are alive;
      select one of the member ports determined to be alive as the active port for management traffic egressing via the link aggregation group; and
      communicate identity of the selected active port to the network interface having the active port;
   wherein the network interface having the active port is configured to, in response to the communication of the identity of the selected active port from the link aggregation agent, communicate the identity of the selected active port to the master control unit.

2. A network element in accordance with claim 1, wherein the master control unit is configured to update the routing table in response to receipt of the identity of the selected active port.

3. A network element in accordance with claim 1, wherein the link aggregation agent is further configured to:
   determine if the active port or a communication link associated with the active port has failed or been removed from the link aggregation group; and
   in response to determining if the active port of a new communication link associated with the active port has failed or been removed from the link aggregation group, select a new active port.

4. A network element in accordance with claim 3, wherein the master control unit is configured to:
   update the routing table in response to a selection of the new active port; and
   communicate the updated routing table to each of the one or more network interfaces.

5. A network element in accordance with claim 1, wherein the master control unit is configured to communicate the routing table to each of the one or more network interfaces in response to an update to the routing table.

6. A network element in accordance with claim 1, wherein the link aggregation group is configured to receive ingress management traffic via any port.

7. A network element in accordance with claim 1, wherein each of the one or more network interfaces monitors the availability of each of its ports in accordance with Link Access Protocol—Channel D (LAPD).

8. A network element in accordance with claim 1, wherein each of the member ports of the link aggregation group other than the active port may tunnel management traffic routed to such ports to the active port in accordance with Address Resolution Protocol (ARP).

9. A network element in accordance with claim 1, wherein the active port enforces packet order of the management traffic.

10. A method comprising:
    configuring a plurality of ports integral to one or more network interfaces as a link aggregation group;
    maintaining, by a master control unit communicatively coupled to the plurality of ports, a routing table including information regarding which of the plurality of physical ports of the link aggregation group is designated as an active port for management traffic egressing via the link aggregation group, wherein the active port carries a communication channel for the management traffic segregated from carrier traffic and is one of a plurality of member ports of the link aggregation group that are alive;
    communicating the routing table to each of the one or more network interfaces;
    determining which member ports of the link aggregation group are alive;
    selecting one of the member ports determined to be alive as the active port for management traffic egressing via the link aggregation group; and
    communicating identity of the selected active port to the network interface having the active port; and
    communicating the identity of the selected active port to the master control unit.

11. A method in accordance with claim 10, further comprising updating the routing table in response to receipt of the identity of the selected active port.

12. A method in accordance with claim 10, further comprising:

determining if the active port or a communication link associated with the active port has failed or been removed from the link aggregation group; and in response to determining if the active port of a new communication link associated with the active port has failed or been removed from the link aggregation group, select a new active port.

13. A method in accordance with claim 12, further comprising:

updating the routing table by the master control unit in response to a selection of the new active port; and communicating the updated routing table to each of the one or more network interfaces.

14. A method in accordance with claim 10, further comprising communicating the routing table to each of the one or more network interfaces in response to an update to the routing table.

15. A method in accordance with claim 10, wherein the link aggregation group is configured to receive ingress management traffic via any port.

16. A method in accordance with claim 10, further comprising monitoring the availability of each of its ports in accordance with Link Access Protocol—Channel D (LAPD).

17. A method in accordance with claim 10, further comprising tunneling, by each of the member ports of the link aggregation group other than the active port, management traffic routed to such ports to the active port in accordance with Address Resolution Protocol (ARP).

18. A method in accordance with claim 10, further comprising enforcing packet order of the management traffic by the active port.

* * * * *